(12) United States Patent
Hardebeck

(10) Patent No.: US 7,201,091 B2
(45) Date of Patent: Apr. 10, 2007

(54) MITER SAW WITH INCREASED CUTTING CAPACITY

(76) Inventor: Jason D. Hardebeck, 1214 Brighton La., Bel Air, MD (US) 21014

( * ) Notice: Subject to any disclaimer, the term of this patent is extended or adjusted under 35 U.S.C. 154(b) by 100 days.

(21) Appl. No.: 10/796,666

(22) Filed: Mar. 8, 2004

(65) Prior Publication Data

US 2005/0193882 A1    Sep. 8, 2005

(51) Int. Cl.
*B23D 45/04* (2006.01)

(52) U.S. Cl. .......................... 83/490; 83/485

(58) Field of Classification Search .................. 83/473, 83/490, 471.3, 485, 607–609
See application file for complete search history.

(56) References Cited

U.S. PATENT DOCUMENTS

| | | | | |
|---|---|---|---|---|
| 46,003 A * | 1/1865 | Hullhorst | ..................... | 83/229 |
| 886,055 A * | 4/1908 | Hillback | ..................... | 83/471.3 |
| 1,662,087 A * | 3/1928 | Thomas et al. | ................ | 74/103 |
| 1,764,965 A * | 6/1930 | Madsen | ..................... | 83/471.2 |
| 2,546,277 A * | 3/1951 | Schwandt | .................. | 83/471.3 |
| 2,704,560 A * | 3/1955 | Woessner | ..................... | 83/473 |
| 3,578,043 A * | 5/1971 | Menge | ..................... | 83/471.3 |
| 3,780,436 A * | 12/1973 | Pellman | ....................... | 30/123 |
| 5,404,779 A * | 4/1995 | Break | ......................... | 83/471.3 |
| 6,865,976 B2 * | 3/2005 | Parks et al. | ................ | 83/471.3 |

* cited by examiner

*Primary Examiner*—Kenneth E. Peterson
(74) *Attorney, Agent, or Firm*—Jeffrey C. Maynard

(57) ABSTRACT

A miter saw design with a cutting arm pivot mechanism that allows the pivot point of the cutting arc to move in a predetermined path in the plane described by the rotating cutting surface. The "floating pivot" enables the tool to accommodate larger pieces of material than conventional miter saws with the same diameter cutting blade. This design also allows the saw to be more compact, lighter in weight, and less complex in comparison to the sliding miter saw. Thus, a miter saw can be provided that provides the cutting capacity of a larger saw with less weight, bulk, and cost than the current alternatives.

17 Claims, 4 Drawing Sheets

MITER SAW WITH INCREASED CUTTING CAPACITY

BACKGROUND OF THE INVENTION

1. Field of the Invention

This invention relates to miter saws, specifically those miter saws used to cut wood, metals, and plastics.

2. Background of the Prior Art

Saws and other apparatuses designed for cutting or performing other working operations on a workpiece, particularly miter saws, typically include mechanisms for moving the saw blade or cutting tool in relationship to the workpiece. Examples of such equipment include miter saws that are adapted for allowing the user to selectively move the saw blade in a vertical plane for cutting. Miter saws are used to make a precise end cuts in these materials, and one of the primary defining characteristics of these types of saws is the maximum capacity in length and depth of cut. It is generally desirable to have a saw with enough capacity to cut the most commonly encountered materials for the job at hand. Two methods of increasing capacity are well understood by the industry. The first method is to increase the diameter of the cutting blade in order to increase the effective cross section of the cut. The primary drawbacks of this method is that the entire saw must be made larger to accommodate a larger saw blade, which adds weight, volume, and cost to the saw.

The second method typically uses a rail and bearing assembly that allows the cutting head to traverse across the material to be cut, thereby increasing the effective cross section of the cut. This method also has significant drawbacks, due to increases in material costs, weight, and complexity.

The intent of the discovery process was to determine if there was another method to increase the capacity of a miter saw that avoided or minimized the increase in weight, volume, cost, and complexity. Such a saw would be very beneficial to a user who is interested in a miter saw with the capacity of a larger saw without increased size and weight. Saws with large capacity tend to be heavy, bulky, and expensive. On the other hand, saws that are less heavy and more compact often do not have the capacity necessary to meet the user's requirements. From the foregoing, it is apparent that there is a need for a miter saw with increased saw capacity without adding significantly to the cost, weight, and size of the unit.

SUMMARY OF THE INVENTION

It is, therefore, an object of the present invention to provide a miter saw with increased capacity that avoids the disadvantages of the prior art.

Another object of the present invention is to provide a miter saw that can safely make a longer cut. A related object is to provide a miter saw having a floating pivot point.

This invention enables a miter saw with increased cutting capacity, having a cutting surface that is mounted on a rigid arm with an improved pivot mechanism. The pivot mechanism is constructed in a way such that the pivot point of the cutting arc is not fixed at a single point. Instead, the pivot point is allowed to move in the same plane as the cutting surface, which has the effect of increasing the effective radius of the cutting edge.

This improvement results in a miter saw with the capacity of a larger saw without increasing the diameter of the saw blade or the addition of a sliding rail assembly. The improved miter saw can be made smaller, lighter, and for less cost than a typical unit can.

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

The invention summarized above and defined by the enumerated claims may be better understood by referring to the following description, which should be read in conjunction with the accompanying drawings in which like reference symbols are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
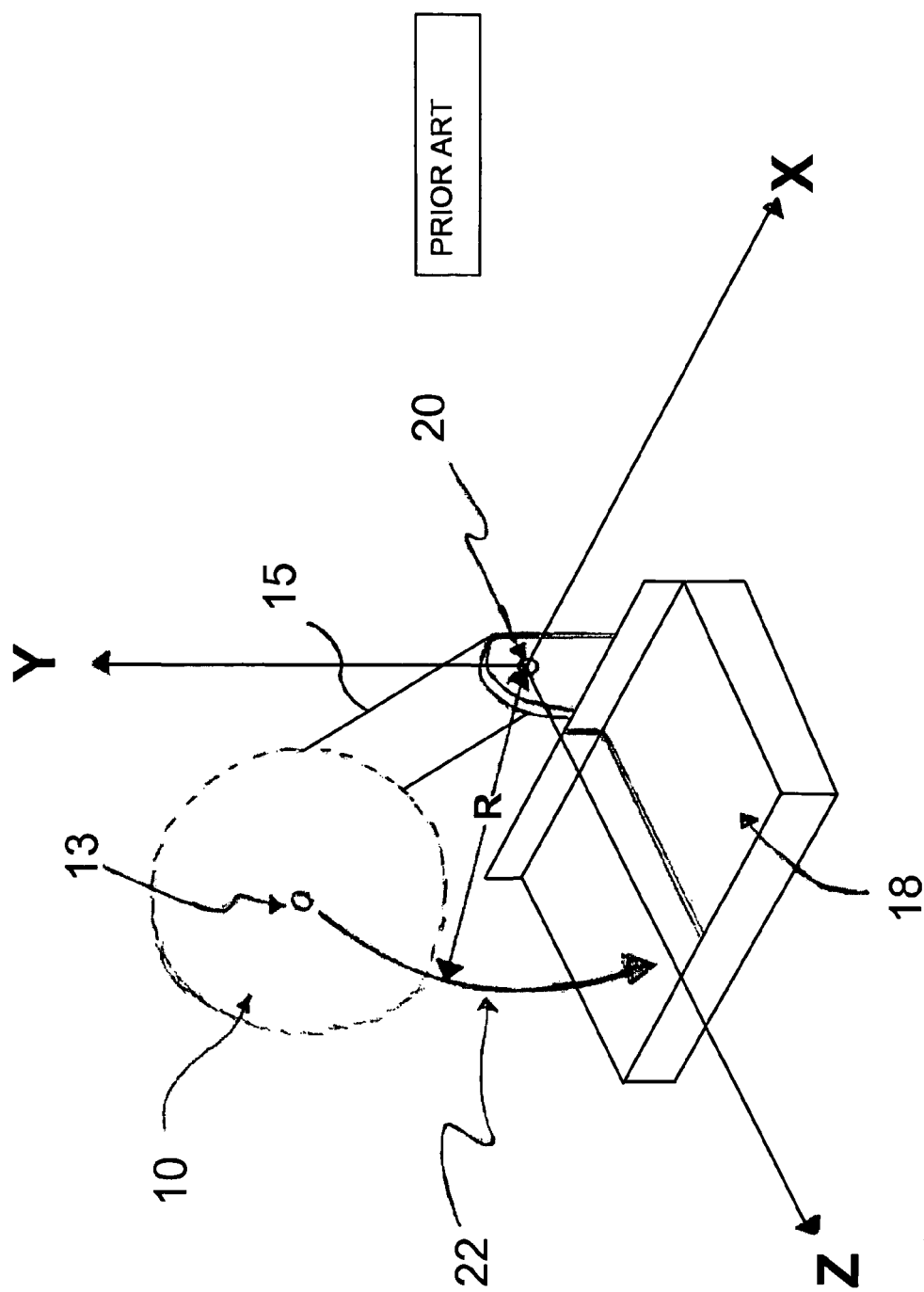
FIG. 1 is a right-side perspective view of a prior art miter saw design, showing the cutting blade affixed to an arm that pivots about a fixed point.

FIG. 1 is a right-side perspective view of a typical prior art miter saw design that shows a circular saw blade 10 affixed to a rotating motor shaft at 13. This assembly is mounted to an arm 15 that is pivotably attached to a stationary table 18 at a single pivot point 20. Pivot point 20 becomes the origin of the XYZ axes where the cutting surface is defined by the X-Z plane. The cutting path, indicated generally at 22, is described by an arc of radius R, which is the fixed distance between the pivot point 20 and the motor shaft 13 in the Y-Z plane. The depth and width of cut is defined by a chord of the saw blade as it passes into a slot on the stationary table 18 and the distance from the motor shaft 13 to the surface of the table 18.

Figure 2:
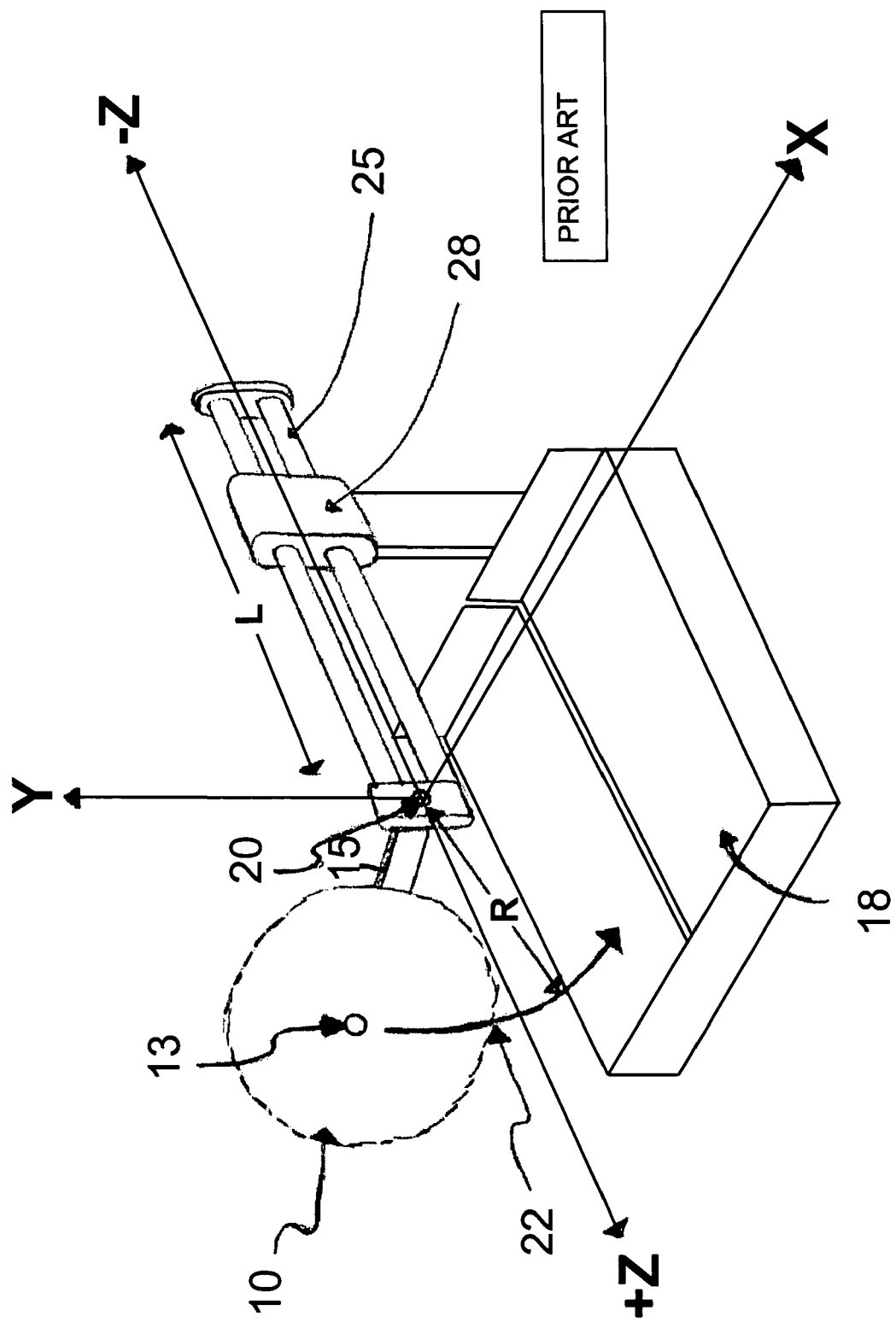
FIG. 2 is a right-side perspective of a prior art sliding-type miter saw design, showing the cutting blade affixed to an arm that pivots about a fixed point.

FIG. 2 is a right-side perspective view of a typical prior art sliding miter saw design that shows the circular saw blade 10 affixed to rotating motor shaft 13. This assembly is mounted to an arm 15 that is pivotably mounted to the front part of the sliding rail assembly 25 at a single pivot point 20. Rail assembly 25 is constrained along the Z-axis by a stationary bearing assembly 28. The lateral movement of rail assembly 25 produces an action that causes the pivot point 20 to move along the cutting plane for a distance L. This increases the width of cut by enabling the cutting path 22 with radius R to traverse across the work surface.

Figure 3:
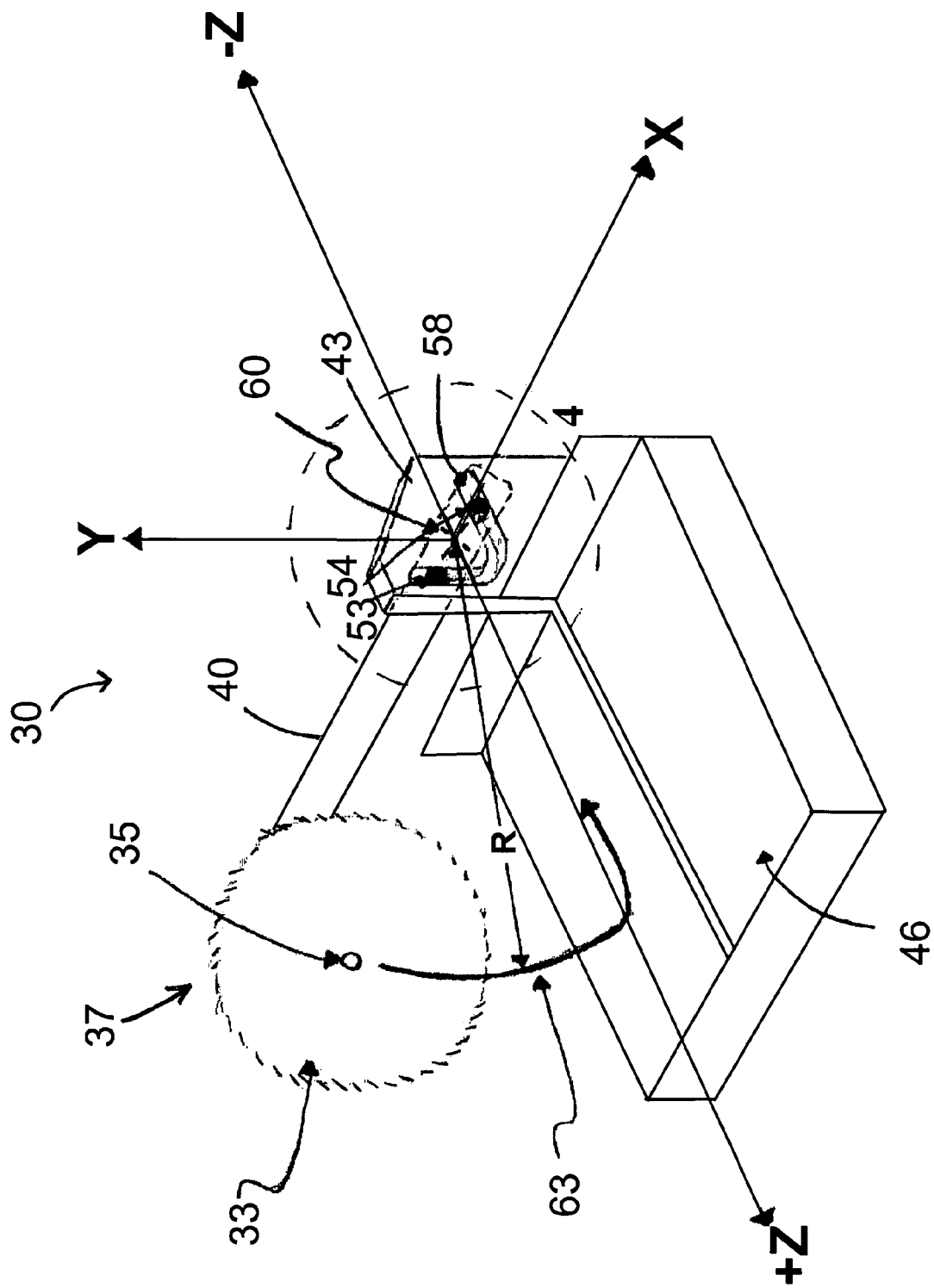
FIG. 3 is a right-side perspective of a miter saw with a pivot mechanism that incorporates the present invention.

FIG. 3 shows a right-side perspective of one example of an improved miter saw that employs a "floating pivot" as contemplated by the present invention. The saw, indicated generally as 30, comprises blade 33 affixed to motor shaft 35 to form a blade and motor assembly 37, which is affixed to a rigid arm 40. The rigid arm 40 is movably attached to a stationary bracket 43 on the back of stationary table 46.

Figure 4:
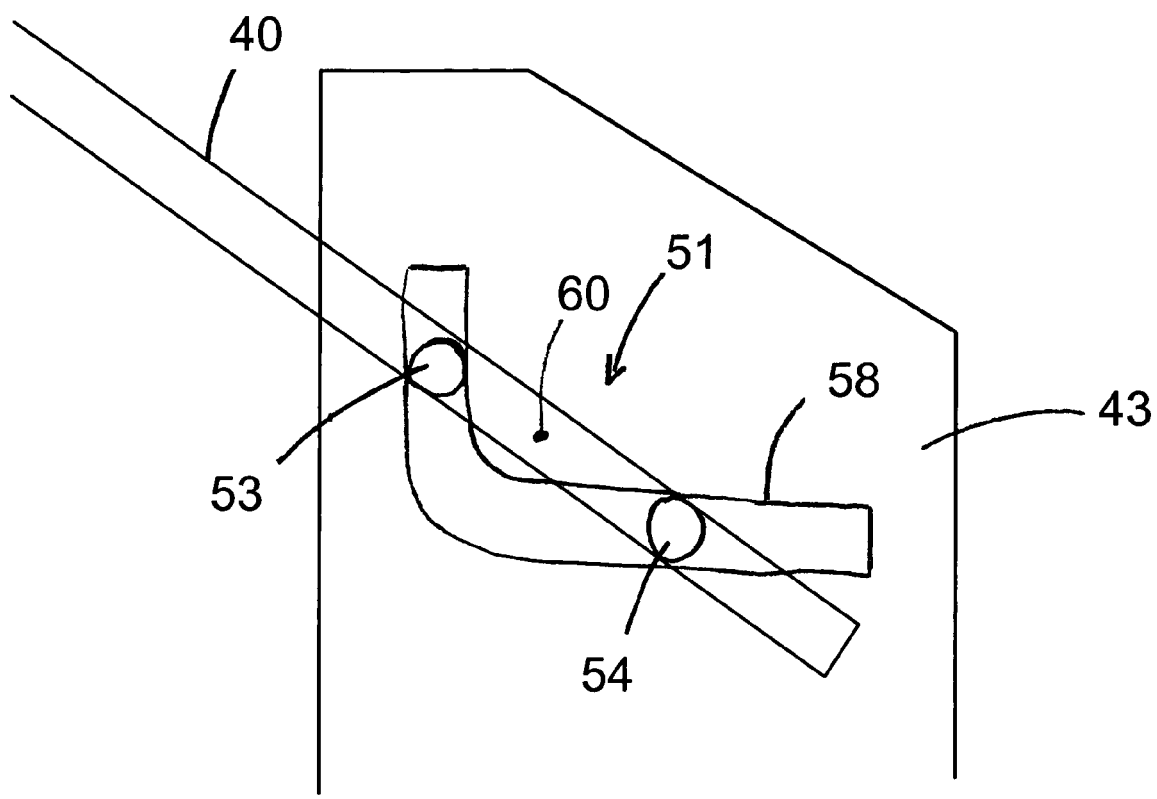
FIG. 4 is an enlarged view of a portion of FIG. 3.

Referring to FIG. 4, arm 40 is attached to post 43 by a pivot assembly 51 comprising two bearing surfaces 53, 54. Such bearing surfaces 53, 54 may be rolling bearings or other suitable bearings. In a preferred embodiment, the pivot assembly 51 further comprises a fixed track 58, such that bearings 53, 54 are constrained in the fixed track 58 in the stationary bracket 43. Such track 58 is sized and configured to enable the bearings 53, 54 to move within the track 58, causing the pivot point of arm 40 to shift. As the blade and motor assembly 37 moves down towards a work surface, the bearings 53, 54 and track 58 in pivot assembly 51 cause the effective (or floating) pivot 60 to move in an eccentric arc. This in turn produces a cutting path 63 with radius R that is not semicircular. Instead, the cutting path 63 follows an eccentric path in the Y-Z plane that results in an increased width of cut at the work surface.

The disclosed embodiment shows the pivot assembly comprising a pair of bearings. In an alternate embodiment, the floating pivot can be achieved by a cam assembly, by a pulley system, or by a gear assembly. Other methods of achieving such floating pivot will become apparent to those skilled in the art by following the teaching of the present invention.

In operation a user operates the improved miter saw 30 in a normal manner by placing the material to be cut on the stationary saw table 46 and moving the blade assembly 37 and arm 40 down toward the material using a typical handle assembly (not shown). As the user applies downward pressure on the blade assembly 37, the pivot assembly 51 described by bearings 53, 54 and fixed track 58 enables the blade 33 to move along the cutting arc 63 without deviation. The user is able to make a wider cut because the blade 33 moves parallel to the surface of table 46 as the cutting path 63 changes from an eccentric curve to a straight path along the Z-axis.

In an alternate embodiment, a biasing mechanism, such as a spring assembly, can be incorporated into the pivot assembly 51 to enable the cutting arm 40 to return to the upright position easily and safely.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A miter saw, comprising:
    a base;
    an arm;
    a saw assembly attached to a first end of said arm, said saw assembly having a saw blade with a saw blade axis; and
    a support housing connected to said base, said support housing including a pivot assembly having a moveable pivot axis that is parallel to said saw blade axis, wherein
        said arm is slidably attached to said pivot assembly at a second end of said arm; and
        said pivot assembly comprises a pair of spaced-apart bearing surfaces engaged in a common track, said track having a substantially straight vertical portion and a substantially straight horizontal portion, wherein each of said bearing surfaces is enabled to traverse in said horizontal portion and one of said bearing surfaces is enabled to traverse in said vertical portion.

2. The miter saw of claim 1, wherein said pair of spaced-apart bearing surfaces comprise rolling bearings.

3. The miter saw of claim 1, wherein said track makes a smooth transition from said substantially vertical portion to said substantially horizontal portion.

4. The miter saw of claim 1, wherein said track is sized and configured to enable both said bearing surfaces to traverse in said substantially horizontal portion simultaneously.

5. The miter saw of claim 1, wherein said saw assembly provides a cutting stroke in a downward vertical direction and in a horizontal direction.

6. The miter saw of claim 1 said saw assembly further comprising:
    a blade; and
    a motor operatively connected to said blade.

7. The miter saw of claim 1, wherein a pivot point for said arm, created by said pivot assembly is allowed to move in a predetermined path in a plane described by the saw assembly.

8. The miter saw of claim 7, wherein said pivot point comprises a floating pivot.

9. A table saw, comprising:
    a base;
    a saw assembly pivotably mounted to said base, said saw assembly comprising:
        an arm, moveable relative to said base; and
        a saw blade with a saw blade axis; and
        a pivot assembly operatively connected to said arm for moving said saw assembly in an eccentric arc in a plane perpendicular to said base, said pivot assembly having a moveable pivot axis that is parallel to said saw blade axis, said pivot assembly comprising a pair of spaced-apart bearing surfaces engaged in a common track, said track having a substantially straight vertical portion and a substantially straight horizontal portion, wherein each of said bearing surfaces is enabled to traverse in said horizontal portion and one of said bearing surfaces enabled to traverse in said vertical portion.

10. The table saw of claim 9, wherein said track is sized and configured to enable both said bearing surfaces to traverse in said substantially horizontal portion simultaneously.

11. The table saw of claim 9, wherein said saw assembly provides a cutting stroke in a downward vertical direction and in a horizontal direction.

12. The table saw of claim 9, further comprising a rotatable cutting tool supported by said arm.

13. The table saw of claim 12, said saw assembly further comprising:
a blade; and
a motor operatively connected to said blade.

14. The table saw of claim 9, wherein said pair of spaced-apart bearing surfaces comprise rolling bearings.

15. The table saw of claim 9, wherein said track makes a smooth transition from said substantially vertical portion to said substantially horizontal portion.

16. The table saw of claim 9, wherein a pivot point for said arm, created by said pivot assembly is allowed to move in a predetermined path in a plane described by the saw assembly.

17. The table saw of claim 16, wherein said pivot point comprises a floating pivot.

* * * * *